United States Patent [19]

Nakano

[11] Patent Number: 4,893,517

[45] Date of Patent: Jan. 16, 1990

[54] CONTINUOUSLY VARIABLE TRACTION ROLLER TRANSMISSION

[75] Inventor: Masaki Nakano, Kawasaki, Japan

[73] Assignee: Nissan Motor Co., Ltd., Yokohama, Japan

[21] Appl. No.: 314,846

[22] Filed: Feb. 24, 1989

[30] Foreign Application Priority Data

Mar. 7, 1988 [JP] Japan .................................. 63-52977

[51] Int. Cl.$^4$ .............................................. F16H 15/12
[52] U.S. Cl. ...................................................... 74/200
[58] Field of Search ........................................... 74/200

[56] References Cited

U.S. PATENT DOCUMENTS 3,430,504 3/1969 Dickenbrock ........................ 74/200
4,693,134 9/1987 Kraus ................................ 74/200 X

FOREIGN PATENT DOCUMENTS 61-116166 6/1986 Japan .

OTHER PUBLICATIONS

Kraus et al., "A Continuously Variable Transmission for Automotive Fuel Economy", Society of Automotive Engineers, Inc., Paper 751180, (1974).

*Primary Examiner*—Allan D. Herrmann

*Attorney, Agent, or Firm*—Foley & Lardner, Schwartz, Jeffery, Schwaab, Mack, Blumenthal & Evans

[57] ABSTRACT

Disclosed herein is a continuously variable traction roller transmission of a double cavity type, which comprises a casing; a partition wall installed in the casing to define front and rear cavities in the same; a first shaft extending through the front and rear cavities; first and second motion transmitting traction mechanisms respectively installed in the front and rear cavities and disposed about the first shaft, each mechanism being operatively connected to the first shaft and including opposite paired input and output toroidal discs and paired traction rollers disposed between and in engagement with the paired input and output toroidal discs; a second shaft extending through only the rear cavity; a first device for operatively connecting the second shaft to both of the first and second motion transmitting traction mechanisms; a second device for biasing one of the paired input and output discs of each motion transmitting traction mechanism toward the other in accordance with a magnitude of torque applied to the one disc; a third device for constantly biasing one of the paired input and output discs of each motion transmitting traction mechanism toward the other; and a fourth device for rotatably mounting adjacent two of the discs of the respective first and second motion transmitting traction mechanisms to the partition wall.

12 Claims, 2 Drawing Sheets

CONTINUOUSLY VARIABLE TRACTION ROLLER TRANSMISSION

BACKGROUND OF THE INVENTION

1. Field of the Invention

The present invention relates in general to continuously variable traction roller transmissions, and more particularly to the transmissions of a double cavity type which has on a common axis two sets of motion transmitting traction mechanisms.

2. Description of the Prior Art

Japanese Patent First Provisional Publication 61-116166 shows one continuously variable traction roller transmission having motion transmitting traction rollers disposed between, and in engagement with, opposite toroidal discs mounted on input and output shafts. Under operation of the transmission, the torque applied to the toroidal input disc from a prime mover (for example, automotive engine) is transmitted through the traction rollers to the toroidal output disc.

During this, the rotation speed change ratio between the toroidal input and output discs is infinitely varied depending on the angle at which each traction roller inclines relative to the common axis on which the input and output discs are mounted.

In order to avoid slippage between each traction roller and the input and output discs, a biasing device is employed by which the mutually engaging roller and disc are biased toward each other. The biasing device is controlled by a controller in such a manner that the biasing force is varied in proportion to a torque applied to the input disc. Usually, a disc spring is used for the biasing device, and a loading cam structure is used for the controller.

Thus, when a large torque transmitting is required, it becomes necessary to provide the transmission with a stronger and thus large-sized biasing device. In this case, however, the entire construction of the transmission becomes large in size, particularly, in the size in radial direction.

In order to solve this drawback, there has been proposed a so-called double cavity type transmission which has on a common axis two sets of motion transmitting traction mechanisms. This type of transmission is shown in the Publication entitled "Machine Design" published on Apr. 18, 1974 and SAE (Society of Automotive Engineers, Inc.) Paper 751180. That is, by bearing the input torque by the two motion transmitting traction mechanisms, each mechanism is allowed to be constructed compact in size particularly in radial direction thereby permitting reduction in radial size of the entire construction of the transmission. As is known, reduction in size of automotive parts is quite advantageous in manufacturing of motor vehicles.

In fact, in the transmission of such type, the respective input discs of the two mechanisms are positioned adjacent to each other, and a loading cam structure is provided for each input disc. Each loading cam structure functions to bias the input disc toward the corresponding output disc in accordance with a torque applied to the input disc. The loading cam structures are supported by an intermediate member which is engaged with respective support shafts of the two mechanisms.

However, due to inherency of the above-mentioned arrangement of the loading cam structures, undesirable phenomenon tends to occur that during operation of the loading cam structures, the intermediate member is subjected to an axial displacement causing unstable placement of the input discs. When, in fact, the stable placement of the input discs is not obtained, the paired traction rollers fail to place their rotation centers at the center of the two input discs thereby excerting bad influence upon the speed change characteristics of the transmission.

SUMMARY OF THE INVENTION

It is therefore an essential object of the present invention to provide a double cavity type continuously variable traction roller transmission which is free of the above-mentioned drawback.

According to the present invention, there is provided a double cavity type continuously variable traction roller transmission in which adjacent two toroidal discs of two motion transmitting traction mechanisms are arranged to be suppressed from making axial movement.

According to the present invention, there is provided a continuously variable traction roller transmission of a double cavity type, which comprises a casing; a partition wall installed in the casing to define front and rear cavities in the same; a first shaft extending through the front and rear cavities; first and second motion transmitting traction mechanisms respectively installed in the front and rear cavities and disposed about the first shaft, each mechanism being operatively connected to the first shaft and including opposite paired input and output toroidal discs and paired traction rollers disposed between and in engagement with the paired input and output toroidal discs; a second shaft extending through only the rear cavity; first means for operatively connecting the second shaft to both of the first and second motion transmitting traction mechanisms; second means for biasing one of the paired input and output discs of each motion transmitting traction mechanism toward the other in accordance with a magnitude of torque applied to the one disc; third means for constantly biasing one of the paired input and output discs of each motion transmitting traction mechanism toward the other; and fourth means for rotatably mounting adjacent two of the discs of the respective first and second motion transmitting traction mechanisms to the partion wall.

BRIEF DESCRIPTION OF THE DRAWINGS

Other objects of the invention will become apparent from the following description when taken in conjunction with the accompanying drawings, in which.

DETAILED DESCRIPTION OF THE INVENTION

Figure 1:
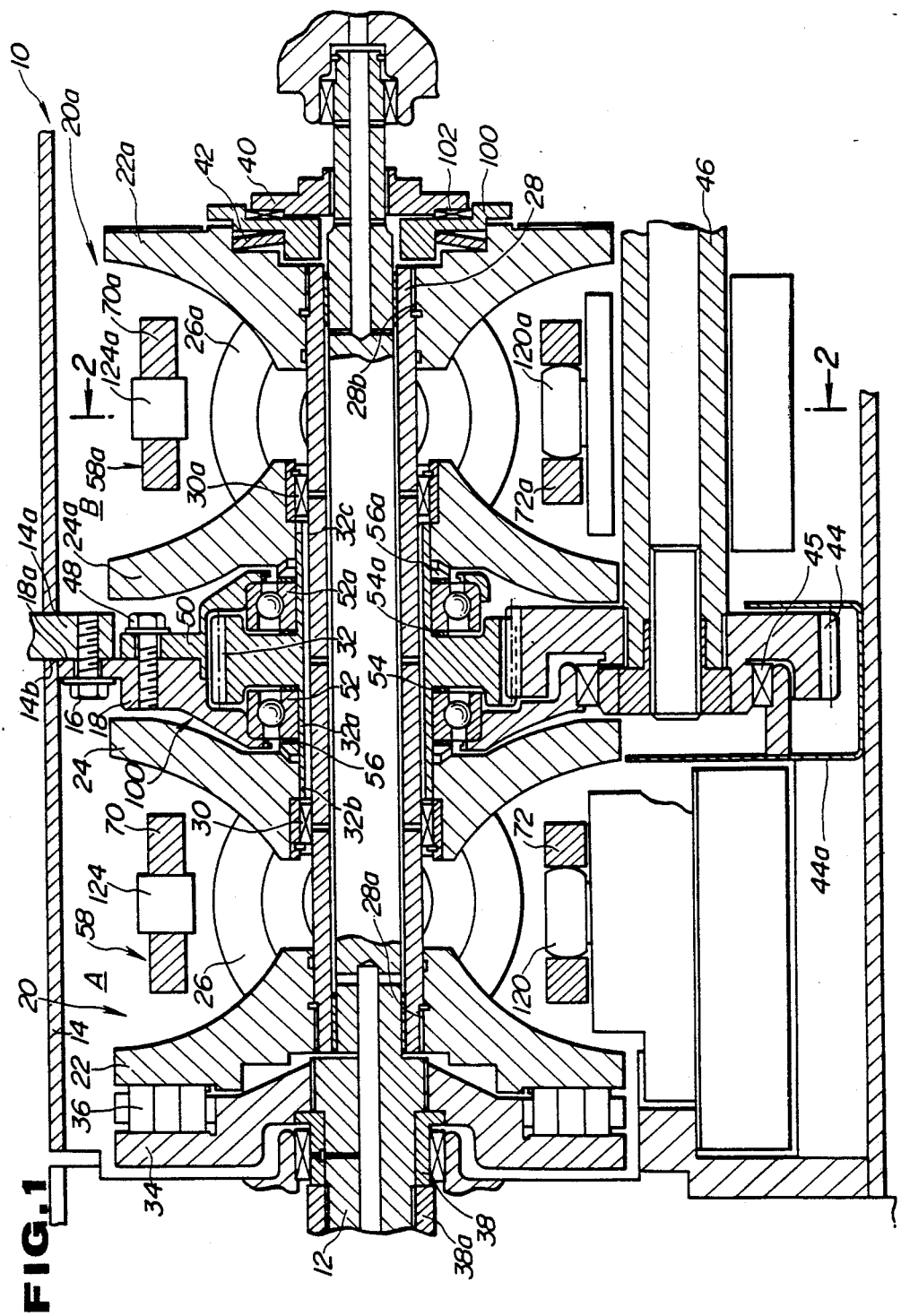
FIG. 1 is a sectional view of an essential portion of a double cavity type continuously variable traction roller transmission according to the present invention.

Referring to the drawings, particularly, FIG. 1, there is shown a double cavity type continuously variable traction roller transmission according to the present invention, which is generally designated by numeral 10. A torque converter (not shown) is arranged at left side, as viewed in FIG. 1, of the transmission 10. Designated by numeral 12 is an input shaft (or first shaft) which extends from the torque converter. The input shaft 12 is rotatably held by a casing 14. A known measure is employed for permitting a slight axial movement of the input shaft 12 relative to the casing 14 for the reason as will become apparent as the description proceeds. Designated by numeral 18 is a partition wall which is secured by bolts 16 to the casing 14 thereby to define front and rear cavities A and B in the casing 14.

First and second motion transmitting traction mechanisms 20 and 20a are installed in the front and rear cavities A and B respectively and they are coaxially arranged. The first mechanism 20 comprises a first toroidal input disc 22, a first toroidal output disc 24 arranged opposite to the first input disc 22, and first paired traction rollers 26 which are disposed between and in engagement with the input and output discs 22 and 24. Similar to this, the second mechanism 20 comprises a second toroidal input disc 22a, a second toroidal output disc 24a and second paired traction rollers 26a. The first input and output discs 22 and 24 and the second input and output discs 22a and 24a are disposed on a common axis.

The paired traction rollers 26 or 26a are inclinable relative to the common axis, so that speed change ratio between the input and output discs 22 and 22a (or, 24 and 24a) is infinitely varied depending on the angle at which the traction rollers incline relative to the common axis.

In the present invention, the first and second output discs 24 and 24a are arranged close to each other in a back-to-back manner with an interposal of the partition wall 18 therebetween, while the first and second input discs 22 and 22a are arranged at a distance from each other.

The first and second input discs 22 and 22a are respectively connected through serrations 28a and 28b to front and rear ends of a hollow torque shaft 28 which is rotatably disposed about the input shaft 12.

The first and second output discs 24 and 24a are rotatably disposed about the torque shaft 28 through respective needle bearings 30 and 30a.

An output gear 32 is rotatably disposed about the torque shaft 12 at a position between the first and second output discs 24 and 24a. The output gear 32 has front and rear hub portions 32a to which the first and second output discs 24 and 24a are connected through serrations 32b and 32c.

Thus, the first and second input discs 22 and 22a are connected through the torque shaft 28 to rotate together, while, the first and second output discs 24 and 24a are connected through the hub portions 32a of the output gear 32 to rotate together.

At an axially outer side of the first input disc 22, there is arranged a cam flange 34 which is connected through serrations (no numeral) to the input shaft 12 to rotate therewith.

A loading cam structure 36 serving as biasing means is arranged between the cam flange 34 and the first input disc 22, so that the torque of the input shaft 12 is transmitted to the first input disc 22 through the cam flange 34 and the loading cam structure 36.

The loading cam structure 36s is constructed to increase an expanding force, which is applied between the cam flange 34 and the first input disc 22, in accordance with the magnitude of torque possessed by the input shaft 12. That is, during torque transmitting operation, there is produced a relative but slight rotation (or phase shift) between the cam flange 34 and the first input disc 22 turning each element of the loading cam structure 36 about an axis.

Thus, when a torque is transmitted from the cam flange 34 to the first input disc 22, the loading cam structure 36 is actuated to bias the first input disc 22 toward the first output disc 24 thereby increasing the contact force with which the input and output discs 22 and 24 are engaged with the first paired traction rollers 26.

The cam flange 34 is connected to the input shaft 12 through a stopper 38 and a nut 38a, so that a counterforce generated when the loading cam structure 36 presses against the first input disc 22 is applied to the input shaft 12.

The torque applied to the first input disc 22 is transmitted to the second input disc 22a through the torque shaft 28.

At an axially outer side of the second input disc 22a, there is arranged a biasing means for constantly biasing the second input disc 22a toward the second output disc 24a. The biasing means comprises a disc spring 42 which is compressed between the input disc 22a and a spacer 100 which is, in turn, connected through a needle thrust bearing 102 to a nut 40 which is screwed to the input shaft 12. A counterforce of the biasing force is thus applied through the nut 40 to the input shaft 12.

The counterforce of the loading cam structure 36 and that of the disc spring 42 are thus transmitted to the second input disc 22a and the first input disc 22 respectively through the axially movable input shaft 12.

Accordingly, the biasing force produced by the disc spring 42 is applied to the first motion transmitting traction mechanism 20 as well as the second motion transmitting traction mechanism 20a, and the biasing force produced by the loading cam structure 36 is applied to the second motion transmitting traction mechanism 20a as well as the first motion transmitting traction mechanism 20.

Because the first and second output discs 24 and 24a are connected through the serrations 32b and 32c to the output gear 32, the torque transmitted to the first output disc 24 and that transmitted to the second output disc 24a are united at the output gear 32 and then the united torque is transmitted to an output shaft 46 (or, second shaft) through a drive gear 44 which is meshed with the output gear 32.

As is shown in FIG. 1, the output shaft 46 is placed in the rear cavity B of the casing 14. That is, the output shaft 46 has no portion which extends through the front cavity A of the casing 14. The output shaft 46 is arranged in parallel with the input shaft 12. A left end (as viewed in this drawing) of the output shaft 46, to which the drive gear 44 is secured, is rotatably held by the partition wall 18 through a bearing 45.

An oil cover 44a is arranged to cover a lower part of the drive gear 44. With this oil cover 44a, the resistance of oil against rotation of the drive gear 44 in the oil is lowered.

As is understood from the drawings, the paired traction rollers 26 or 26a are arranged at opposite sides with respect to the input shaft 12. As is seen from FIG. 2, each traction roller 26 or 26a has a curved peripheral portion which is intimately engaged with the toroidal surfaces of the input and output discs 22 and 24 (or, 22a and 24a).

The first and second paired traction rollers 26 and 26a are pivotally supported by first and second supporting mechanisms 58 and 58a respectively.

Since the first and second supporting mechanisms 58 and 58a are substantially the same in construction, the following description will be directed to only the second supporting mechanism 58a to avoid repeated explanation.

Figure 2:
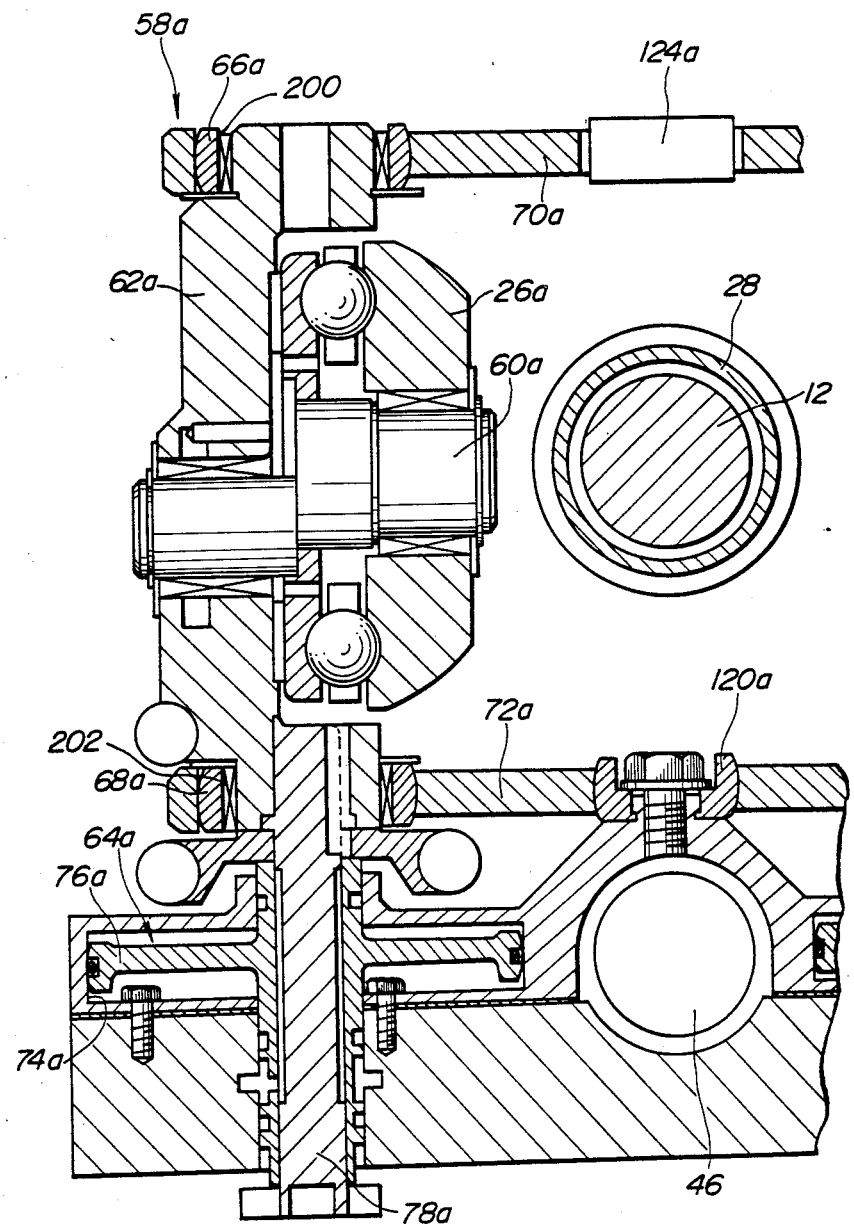
FIG. 2 is a sectional view taken along the line II—II of FIG. 1.

Referring to FIG. 2, there is partially shown the second supporting mechanism 58a, which is a view taken along the line II—II of FIG. 1.

The second supporting mechanism 58a comprises two idential units (only one is illustrated in FIG. 2) which are arranged at opposite sides with respect to the input shaft 12. Each unit includes an eccentric shaft 60a on which the traction roller 26a is rotatably supported, a supporting member 62a to which the eccentric shaft 60a is pivotally connected, and a hydraulic actuator 64a which moves the supporting member 62a in a direction perpendicular to the axis of the eccentric shaft 60a.

A first portion of the eccentric shaft 60a on which the traction roller 26a is rotatably disposed and a second portion of the shaft 60a which is rotatably connected to the supporting member 62a are eccentric to each other. The eccentricity of one eccentric shaft 60a is reversed to that of the other eccentric shaft (not shown).

Each supporting member 62a has upper and lower ends and inclinably supported through spherical bearings 66a and 68a by upper and lower links 70a and 72a respectively. In addition, needle bearings 200 and 202 allow each supporting member 62a to rotate relative to upper and lower links 70a and 72a.

Each hydraulic actuator 64a comprises a cylinder 74a, a piston 76a and a piston rod 78a. The piston rod 78a is connected to the supporting member 62a to move together.

Due to the nature of the reversedly mounted eccentric shafts 60a of respective units, the two piston rods 78a of the same are permited to move in opposite directions in response to an application of control hydraulic pressure from a second control valve (not shown).

Accordingly, when the two hydraulic actuators 64a are operated by the hydraulic pressure, the two supporting members 62a are moved in opposite directions and thus the upper and lower links 70a and 72a are inclined.

With this, the two traction rollers 26a displaced between the input and output discs 22a and 24a are inclined about respective axes which are parallel with the piston rods 78a of the hydraulic actuators 64a.

As has been described hereinafore, the first supporting mechanism 58 has substantially the same construction as the above-mentioned second supporting mechanism 58a. Thus, as will be understood from FIG. 1, when a hydraulic actuator (not shown) of the first supporting mechanism 58 is operated by a first control valve (not shown), the two traction rollers 26 are inclined in substantially the same manner as the traction rollers 26a of the second supporting mechanism 58a.

The upper links 70 and 70a and lower links 72 and 72a of the above-mentioned first and second supporting mechanisms 58 and 58a are supported by link posts 124 and 124a and other link posts 120 and 120a which are all secured to the casing 14. Thus, the rotation center of each traction roller 26 or 26a is stably held in a given position relative to the casing 14.

It is to be noted that since the first and second motion transmitting traction mechanisms 20 and 20a are arranged in opposed manner, the corresponding parts of the first and second supporting mechanisms 58 and 58a are moved in opposite directions.

In accordance with the present invention, the following measure is further employed.

As is well shown in FIG. 1, the output gear 32 is received in a space which is defined by both an apertured portion of the partition wall 18 and an apertured auxiliary wall 50 secured by bolts 48 to the partition wall 18. Within the apertures, there are arranged respective angular ball bearings 52 and 52a which are, in turn, coaxially disposed about the front and rear hub portions 32a of the output gear 32. Thus, the output gear 32, and thus the first and second output discs 24 and 24a are rotatably supported by the partition wall 18 through the angular ball bearings 52 and 52a.

A spacer 54 or 54a is disposed between an inner race of the bearing 52 or 52a and the output gear 32, and a shim 56 or 56a is disposed between the inner race and the first or second output disc 24 or 24a, so that the positioning between the first and second output discs 24 and 24a is assured.

That is, with the provision of the output gear 32, the spacers 54 and 54a, the inner races and the shims 56 and 56a, the first and second output discs 24 and 24a are tightly connected to each other to form a single unit, and with the provision of the angular ball bearings 52 and 52a, the disc unit is held by the partition wall 18 without play. That is, the disc unit is exactly positioned with respect to the partition wall 18, that is, with respect to the casing 14 to which the partition wall 18 is secured.

As is seen from FIG. 1, the partition wall 18 has at its peripheral portion a mounting flat surface 18a which is secured by bolts 16 to a mounting portion 14a of the casing 14. The auxiliary wall 50 is secured to the flat surface 18a of the partition wall 18 by bolts 48.

Prior to assembling the entire of the transmission 10, the partition wall 18, the auxiliary wall 50, the output gear 32, the spacers 54 and 54a and the angular ball bearings 52 and 52a are assembled to provide a subassembly unit 100, and the subassembly unit 100 is connected to the mounting portion 14a of the casing 14 by means of the bolts 16. Thereafter, the first and second output discs 24 and 24a are mated with the output gear 32 with the shims 56 and 56a disposed therebetween.

In the following, operation will be described with reference to the drawings.

For ease of understanding, the description will be commenced with respect to a rest condition of the transmission 10 wherein an engine incorporated with the transmission 10 is at a standstill and thus there is no torque applied to the input shaft 12.

Under this rest condition, the biasing force produced by the disc spring 42 is applied to the first and second input discs 22 and 22a, so that the first paired traction rollers 26 are pressed by the first input and output discs 22 and 24 with a certain biasing force, and at the same time, the second paired traction rollers 26a are pressed by the second input and output discs 22a and 24a with a certain biasing force.

When, upon starting of the engine, a certain torque is applied to the input shaft 12, the same is transmitted through the cam flange 28 and the loading cam structure 30 to the first input disc 22 and through the torque shaft 28 to the second input disc 22a causing rotation of the first and second input discs 22 and 22a.

The torque applied to the first and second input discs 22 and 22a is transmitted through the first and second paired traction rollers 26 and 26a to the first and second output discs 24 and 24a. Under this condition, the speed change ratio between the input and output discs 22 and 24 (or, 22a and 24a) is infinitely varied depending on an inclination angle which the paired traction rollers 26 (or 26a) assume.

During the torque transmitting from the input shaft 12 to the first input disc 22, there is produced a relative but slight rotation (or phase shift) between the cam flange 34 and the first input disc 22 thereby turning the loading cam structure 36 about their axes increasing their effective widthes. Thus, the first input disc 22 is biased toward the first output disc 24, and at the same time, a counterforce produced by the disc 22 is applied through the input shaft 12 to the second input disc 22a.

Accordingly, the pressing or contact force with which each torodisal disc 22, 24, 22a or 24a is pressed against the corresponding paired traction rollers 26 or 26a is increased and thus undesired slippage therebetween is suppressed or at least minimized.

In the following, advantages of the present invention will be described.

As described hereinabove, the disc unit consisting of the first and second output discs 24 and 24a is held by the fixed partition wall 18 without play. This means that during operation of the output discs 24 and 24a with biasing forces applied thereto by the disc spring 42 and the loading cam structure 36, there is substantially no axial displacement of the outer discs 24 and 24a relative to the partition wall 18. Thus, the center point between the first input and output discs 22 and 24 and that between the second input and output discs 22a and 24a can be kept at their right positions with respect to the rotation axes of the first and second paired traction rollers 26 and 26a respectively.

Thus, reliable and precise speed change is obtained from the transmission 10 of the invention, unlike the case of the afore-mentioned conventional transmissions.

Since the partition wall 18, the auxiliary wall 50, the output geat 32, the spacers 54 and 54a and the angular ball bearings 52 and 52a can be subassembled prior to assembling of the entire of the transmission, manufacturing of the transmission is easily achieved. In fact, relative positioning between parts of the subassembled unit is easily adjusted because the parts are exposed to the outside.

Since the mounting portion 14a of the casing 14 can be used as a reference structure, mounting of the subassembled unit to the casing 14 is easily and precisely achieved.

Although the above description is directed to a case wherein the first and second output discs 24 and 24a are positioned adjacent to each other, the present invention is also applicable to another case wherein first and second input discs are positioned adjacent to each other.

What is claimed is:

1. A continuously variable traction roller transmission of a double cavity type, comprising:
   a casing;
   a partition wall structure installed in said casing to define front and rear cavities in the same;
   a first shaft extending through said front and rear cavities;
   first and second motion transmitting traction mechanisms respectively installed in said front and rear cavities and disposed about said first shaft, each mechanism being operatively connected to the first shaft and including opposite paired input and output toroidal discs and paired traction rollers disposed between and in engagement with the paired input and output toroidal discs;
   a second shaft extending through only said rear cavity;
   first means for operatively connecting said second shaft to both of said first and second motion transmitting traction mechanisms;
   second means for biasing one of the paired input and output discs of each motion transmitting traction mechanism toward the other in accordance with a magnitude of torque applied to said one disc;
   third means for constantly biasing one of the paired input and output discs of each motion transmitting traction mechanism toward the other; and
   fourth means for rotatably mounting adjacent two of the discs of the respective first and second motion transmitting traction mechanisms to said partion wall structure.

2. A continuously variable traction roller transmission as claimed in claim 1, in which said fourth means comprises a pair of angular bearings each of which is operatively disposed between one of the adjacent two discs and said partition wall structure.

3. A continuously variable traction roller transmission as claimed in claim 2, in which said first shaft is an input shaft and said second shaft is an output shaft.

4. A continuously variable traction roller transmission as claimed in claim 3, in which said first means comprises:
   an output gear rotatably disposed in a space defined by said partition wall structure and connected to both of said adjacent two discs to rotate together; and
   a drive gear meshed with said output gear and secured to said output shaft to rotate together.

5. A continuously variable traction roller transmission as claimed in claim 4, in which said output gear has front and rear hub portions to which said adjacent two discs are connected through serrations.

6. A continuously variable traction roller transmission as claimed in claim 5, in which said front and rear hub portions of said output gear have said angular ball bearings operatively mounted thereon, each angular ball bearing being received in an aperture defined by said said partition wall structure.

7. A continuously variable traction roller transmission as claimed in claim 6, in which said partition wall structure comprises:
   an apertured partition wall base member bolted to a mounting portion of said casing; and
   an apertured auxiliary wall member bolted to said wall base member in a manner to form a housing in which said output gear is received.

8. A continuously variable traction roller transmission as claimed in claim 7, in which said angular bearing comprises an outer race intimately received in the corresponding aperture of said partition wall structure, an inner race disposed on one of said front and rear hub portions of said output gear and balls operatively disposed between said outer and inner races.

9. A continuously variable traction roller transmission as claimed in claim 8, in which a spacer is disposed between said inner race and a major part of said output gear and a shim is disposed between said inner race and corresponding one of said adjacent two discs.

10. A continuously variable traction roller transmission as claimed in claim 9, in which remote two of the discs of the respective first and second motion transmitting traction mechanisms are connected by a hollow torque shaft which is rotatably and coaxially disposed about said input shaft.

11. A continuously variable traction roller transmission as claimed in claim 10, in which said second means comprises a loading cam structure which is operavely disposed between one of the remote two discs and a cam flange connected to said input shaft.

12. A continuously variable traction roller transmission as claimed in claim 11, in which said third means comprises a disc spring which is operatively disposed between the other of the remote two discs and a fixed member of said casing.

* * * * *